United States Patent
Lynch et al.

(10) Patent No.: US 8,218,845 B2
(45) Date of Patent: Jul. 10, 2012

(54) DYNAMIC PULMONARY TRUNK MODELING IN COMPUTED TOMOGRAPHY AND MAGNETIC RESONANCE IMAGING BASED ON THE DETECTION OF BOUNDING BOXES, ANATOMICAL LANDMARKS, AND RIBS OF A PULMONARY ARTERY

(75) Inventors: Michael Lynch, Toronto (CA); Razvan Ionasec, Erlangen (DE); Bogdan Georgescu, Plainsboro, NJ (US); Dorin Comaniciu, Princeton Junction, NJ (US); Dime Vitanovski, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 833 days.

(21) Appl. No.: 12/315,343

(22) Filed: Dec. 1, 2008

(65) Prior Publication Data

US 2009/0154785 A1    Jun. 18, 2009

Related U.S. Application Data

(60) Provisional application No. 61/013,018, filed on Dec. 12, 2007.

(51) Int. Cl.
*G06K 9/00* (2006.01)
*A61B 5/05* (2006.01)

(52) U.S. Cl. ........................ 382/131; 600/426

(58) Field of Classification Search .......... 382/128–134; 250/208.1, 214 R, 214.1, 559.4, 370.08, 370.09; 600/425–429, 409, 459, 431, 407; 345/420, 345/424, 419, 475; 378/21, 41, 901, 98.12
See application file for complete search history.

(56) References Cited

U.S. PATENT DOCUMENTS

| | | | |
|---|---|---|---|
| 6,598,307 B2 | 7/2003 | Love et al. | |
| 2004/0034300 A1* | 2/2004 | Verard et al. | 600/424 |
| 2004/0153128 A1* | 8/2004 | Suresh et al. | 607/14 |
| 2005/0281447 A1 | 12/2005 | Moreau-Gobard et al. | |
| 2006/0062442 A1* | 3/2006 | Arnaud et al. | 382/128 |
| 2007/0036414 A1* | 2/2007 | Georgescu et al. | 382/128 |
| 2007/0135803 A1* | 6/2007 | Belson | 606/1 |
| 2008/0085043 A1 | 4/2008 | Watanabe et al. | |
| 2008/0205722 A1* | 8/2008 | Schaefer et al. | 382/128 |
| 2010/0278405 A1* | 11/2010 | Kakadiaris et al. | 382/131 |

* cited by examiner

*Primary Examiner* — Que T Le
*Assistant Examiner* — Jennifer Bennett

(57) ABSTRACT

A method and system for modeling the pulmonary trunk in 4D image data, such as 4D CT and MRI data, is disclosed. Bounding boxes are detected in frames of the 4D image data. Anatomic landmarks are detected in the frames of the 4D image data based on the bounding boxes. Ribs or centerlines of the pulmonary artery are detected in the frames of the 4D image data based on the anatomic landmarks, and a physiological pulmonary trunk model is fit the frames of the 4D image data based on the detected ribs and anatomic landmarks. The boundary of the pulmonary trunk is detected in order to refine the boundary of the pulmonary trunk model in the frames of the 4D image data, resulting in a dynamic model of the pulmonary trunk. The pulmonary trunk can be quantitatively evaluated using the dynamic model.

26 Claims, 8 Drawing Sheets

DYNAMIC PULMONARY TRUNK MODELING IN COMPUTED TOMOGRAPHY AND MAGNETIC RESONANCE IMAGING BASED ON THE DETECTION OF BOUNDING BOXES, ANATOMICAL LANDMARKS, AND RIBS OF A PULMONARY ARTERY

This application claims the benefit of U.S. Provisional Application No. 61/013,018, filed Dec. 12, 2007, the disclosure of which is herein incorporated by reference.

BACKGROUND OF THE INVENTION

The present invention relates to dynamic modeling of the pulmonary trunk using medical images, and more particularly, to modeling and quantitative evaluation of the pulmonary trunk using 4D computed tomography (CT) and magnetic resonance imaging (MRI) data.

Valvular heart disease (VHD) is a cardiac disorder that affects a large number of patients and often requires elaborate diagnostic procedures, intervention, and long-term management. Although left-side (e.g., aortic) valves are affected more often, pulmonary valve diseases also represent a serious health problem. In most case, pulmonary abnormalities occur in conjunction with other heart disease and can be caused by congenital defects, pulmonary hypertension, endocarditis, rheumatic fever, and carcinoid heart disease. Such conditions require constant monitoring and, at some stage, typically require valve intervention. Accordingly, the management of patients with pulmonary heart disease is an important task.

An example of a complex congenital cardiac defect affecting the pulmonary valve is Tetralogy of Fallot (ToF). ToF represents 5-7% of all congenital heart diseases. FIG. 1 illustrates ToF. As illustrated in FIG. 1, ToF includes four defects within the heart structures: ventricular septal defect, narrowing of the pulmonary outflow tract (pulmonic stenosis), an aorta that grows from both ventricles (overriding aorta), and a thickened muscular wall of the right ventricle (right ventricular hypertrophy). In order to manage a patient with ToF, initial surgery to correct the hemodynamic deficiency is usually performed. This surgery involves both widening of the pulmonary tract and closing the ventricular defect. This initial intervention can damage or in some cases destroy the pulmonary valve leading to pulmonary insufficiency. Pulmonary insufficiency causes regurgitation of the oxygenated blood back into the right ventricle (RV) and right ventricle volume overloading. Re-intervention typically includes replacement of the pulmonary valve using a prosthetic valve. The timing for this re-intervention procedure is not well defined and requires constant monitoring of the patient.

Recently, transcatheter percutaneous pulmonary valve implantation (PPVI) has been proposed for inserting the pulmonary valve replacement without the need for surgery. However, the main difficulty of PPVI is that it is difficult to assess the pulmonary trunk before treatment. Due to this difficulty, management of patients with pulmonary valve disease has remained challenging. Valve evaluation and elaborate intervention planning require accurate measurements of pulmonary trunk dynamics and morphology. Magnetic resonance imaging (MRI) or computed tomography (CT) imaging is the modality of choice when high spatial resolution, soft tissue contrast or dynamics is essential. A key advantage to these modalities is the ability to perform multiple non-harmful and accurate scans required for monitoring. Conventional clinical practice involves manually extracting measurements from two-dimensional MRI/CT images in end-diastolic and end-systolic cardiac phases. This is inefficient and in many cases is not sufficiently accurate due to the complexity of the pulmonary trunk anatomy. Manually determining the same relative axial position within the pulmonary trunk can often lead to biased measurements. Furthermore, two dimensional projections cannot capture through plane motion. Changes in axial measurements may be ambiguous as they are caused both by through plane motion and vascular contraction. Moreover, elaborate functional quantifications are not possible using conventional methods.

BRIEF SUMMARY OF THE INVENTION

The present invention provides a method and system for modeling the pulmonary trunk using 4D computed tomography (CT) or magnetic resonance imaging (MRI) data in order to quantitatively evaluate the function of the pulmonary trunk. The present inventors have developed a dynamic physiological model of the pulmonary trunk, whose parameters can be automatically estimated for an individual patient from 4D image data of the heart. The dynamic physiological model can be used to determine model-based measurements of the pulmonary trunk's geometry and dynamics.

In one embodiment of the present invention, bounding boxes are detected in frames of 4D image data, such as CT or MRI data. The bounding boxes can include a bounding box at the RVOT region and a bounding box at the bifurcation region. Anatomic features are detected in the frames of the 4D image data based on the bounding boxes. The trigone and RVOT can be detected based on the RVOT region bounding box, and a main-bifurcation, left-bifurcation, and right bifurcation can be detected based on the bifurcation region bounding box. Ribs or centerlines of the pulmonary artery are detected based on the anatomic landmarks. A main-rib is detected based on the RVOT and the main-bifurcation, a left-rib based on the main-bifurcation and the left-bifurcation, and the right-rib based on the main-bifurcation and the right-bifurcation. A dynamic model of the pulmonary trunk is generated by fitting a physiological model of the pulmonary trunk to the frames of the 4D image data based on the detected ribs and anatomic landmarks. The boundary of the pulmonary trunk model are refined by detected the pulmonary trunk boundary in the frames of the 4D image data. The dynamic pulmonary trunk model can be used to quantitatively evaluate the pulmonary trunk.

These and other advantages of the invention will be apparent to those of ordinary skill in the art by reference to the following detailed description and the accompanying drawings.

DETAILED DESCRIPTION

The present invention relates to modeling and quantitative evaluation of the pulmonary trunk using 4D computed tomography (CT) or magnetic resonance imaging (MRI) data. Embodiments of the present invention are described herein to give a visual understanding of the heart modeling method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Embodiments of the present invention are described herein as using 4D CT data or 4D MRI data to model and quantitatively evaluate the aortic valve. It is to be understood that the present invention is not limited to CT and MRI data, but can be applied to other medical imaging techniques, such as echocardiography, that collect volumetric image data of the heart over a time period.

Figure 1:
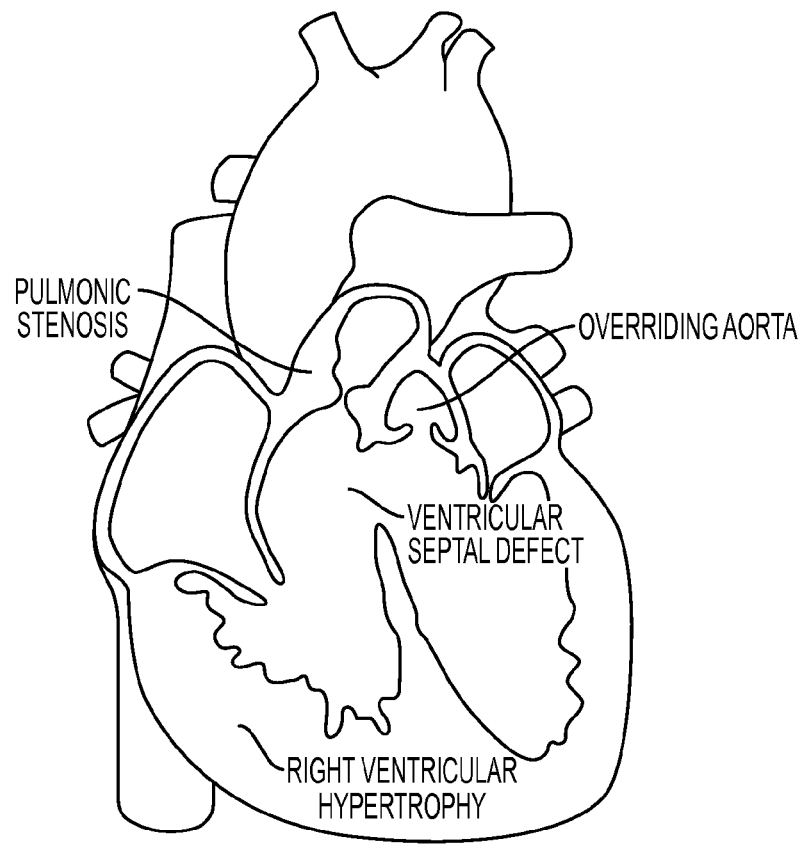
FIG. 1 illustrates Tetralogy of Fallot (ToF)
Figure 2A:
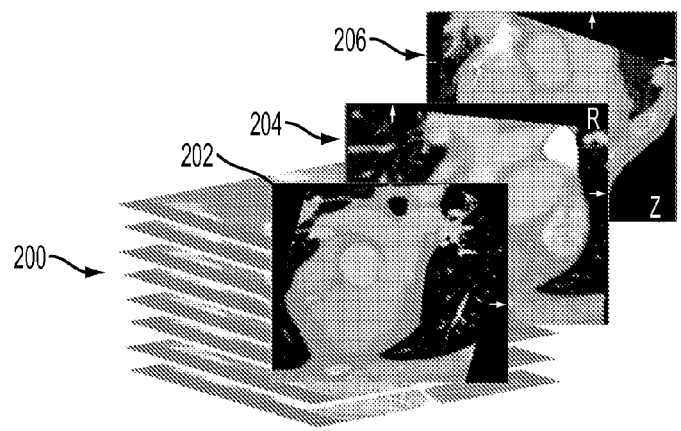
FIG. 2A illustrates exemplary cardiac 4D CT data. CT acquisition protocols enable full 3D data capturing over the whole cardiac cycle.
Figure 2B:
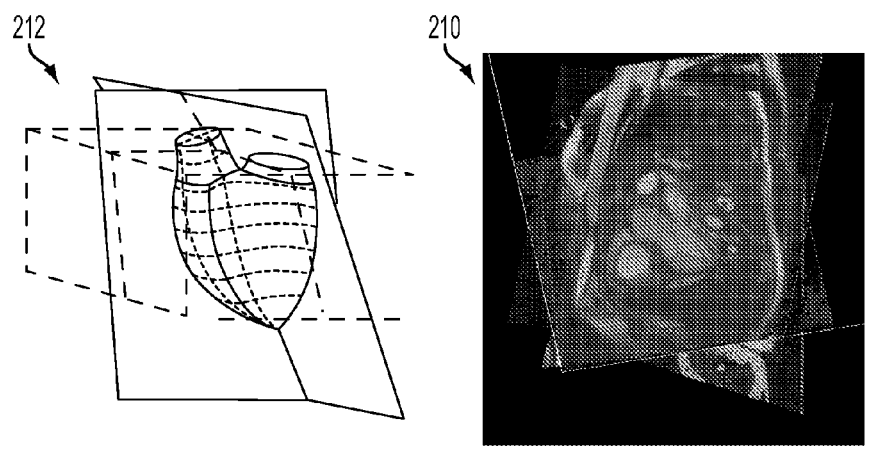
FIG. 2B illustrates exemplary cardiac 4D MRI data.

The present inventors have developed a dynamic modeling framework for the pulmonary trunk which is estimated from cardiac MRI and/or CT data. A generic 4D dynamic model of the pulmonary trunk is computed off line from a comprehensive training set and is independent of image modality. Patient Specific segmentation of the pulmonary trunk is performed by fitting the generic 4D model of the pulmonary trunk to patient specific image data. Based on the subject clinical workflow and equipment availability, the pulmonary trunk model can be estimated for a patient from patient specific CT or MRI data, or both. FIG. 2A illustrates exemplary cardiac 4D CT data. CT acquisition protocols enable full 3D data capturing over the whole cardiac cycle. As illustrated in FIG. 2A, the 4D CT data 200 is a dynamic CT volume sequence taken over a period of time, in which each frame 202, 204, and 206 is a 3D CT volume. FIG. 2B illustrates exemplary cardiac 4D MRI data. MRI data sets are usually sparse 3D+t. As illustrated in FIG. 2B, multiple two dimensional projections from user-specified locations and orientation are acquired in time for tracking the pulmonary trunk deformation over the cardiac cycle, resulting in a sparse 4D data set 210.

Figure 3:
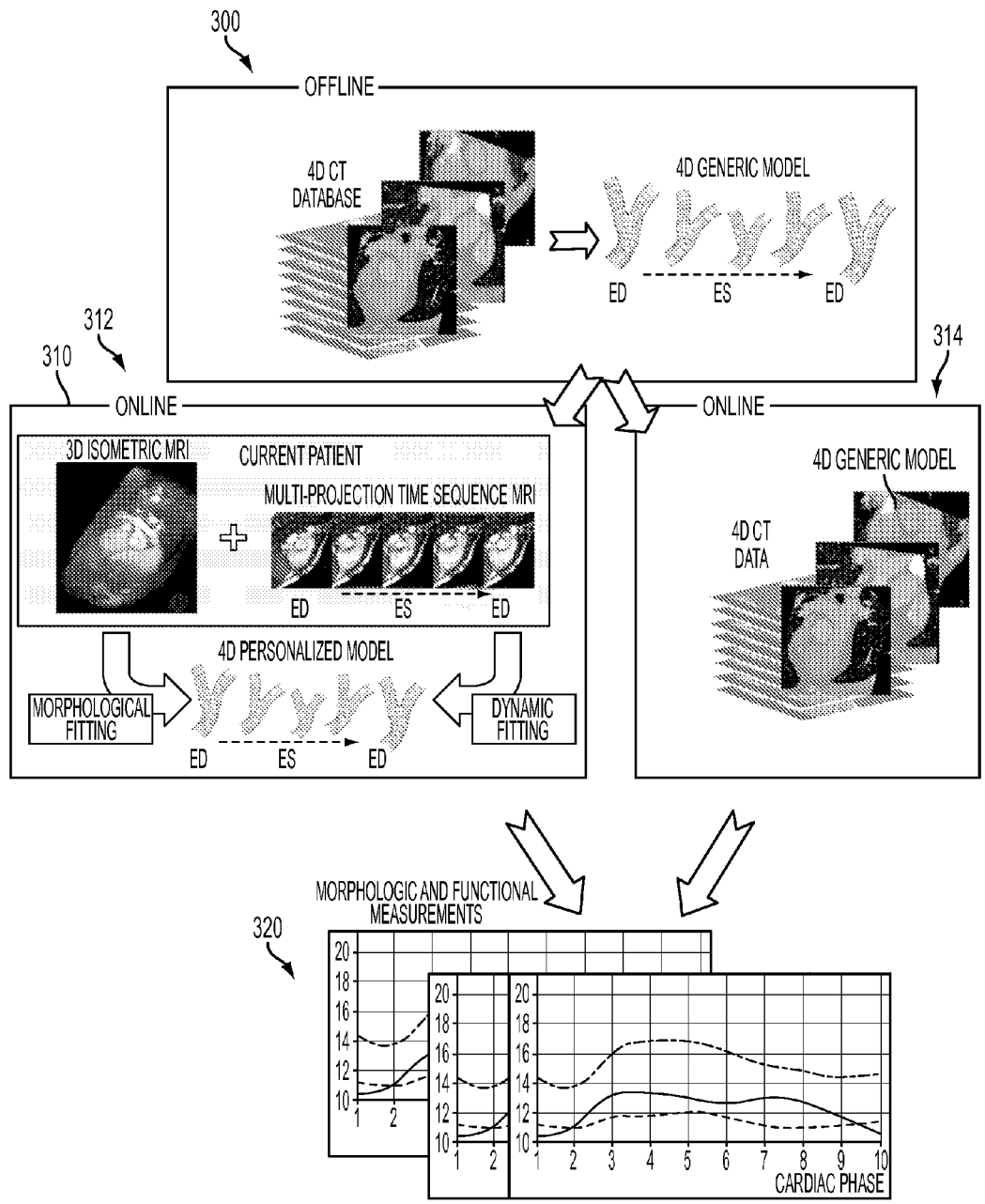
FIG. 3 illustrates a framework for dynamic pulmonary trunk modeling according to an embodiment of the present invention.

FIG. 3 illustrates a framework for dynamic pulmonary trunk modeling according to an embodiment of the present invention. As illustrated in FIG. 3, the framework for a dynamic pulmonary trunk modeling and quantitative evaluation method according to an embodiment of the present invention involves three stages. In the first stage 300, a 4D generic model of the pulmonary artery (trunk) is learned from a comprehensive database of examples. For example, the 4D generic model can be learned from annotated volumes in a database of 4D CT data. The generic model learning stage 300 is performed offline prior to processing patient specific data. In the second stage 310, the 4D generic model of the pulmonary trunk is fitted to patient specific volumetric scans using robust machine-learning methods in order to obtain a patient specific physiological model. The patient specific 4D pulmonary trunk model can be segmented from patient specific 4D CT data (312) or patient specific 4D MRI data (314), which includes 3D isometric MRI data and multi-projection time sequence (2D+t) MRI data. In the third stage 320, morphological and functional measurements of the pulmonary artery are quantified from the patient specific dynamic 4D pulmonary trunk model. Each of the stages 300, 310, and 320 is described in greater detail below.

The first stage 300, which is performed offline and is modality independent, generates a generic dynamic model of the pulmonary trunk from a comprehensive database of CT sequences manually annotated by expert radiologists. Procrustes analysis and principle component analysis (PCA) are used to align the data set and learn the shape and deformation modes of the pulmonary artery in order to make a generic 4D model of the pulmonary trunk. In order to accurately represent morphology and dynamics, the model design is consistent with the anatomy and physiology of the pulmonary trunk. The model is atomically oriented and includes clinically relevant anatomic structures. Geometries are represented parametrically using non-uniform rational B-splines (NURBS), and dynamics are implicitly defined within the same mathematical formulations. The model is formulated in three abstraction layers, anatomical landmarks, ribs, and surface topology.

Figure 4A:
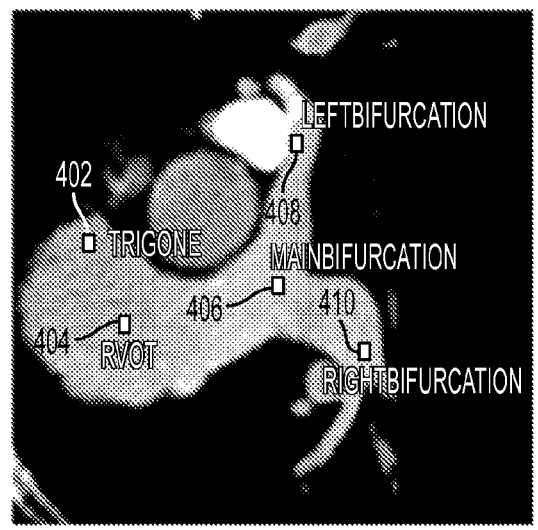
FIG. 4A illustrates the anatomic landmarks in an exemplary CT image.

The first abstraction layer of the pulmonary trunk model is given by five anatomical landmarks. The five anatomic landmarks are the trigone, right ventricular outflow tract (RVOT), main-bifurcation, left-bifurcation, and right-bifurcation. The trigone defines the splitting point between the right ventricle outflow track and the tricuspid valve plane. The RVOT landmark is located on the same plane as the trigone, parallel to the tricuspid valve plane. The main-bifurcation defines the center of the branching of the pulmonary trunk, while the left-bifurcation and the right-bifurcation mark ends of the left and right branches, respectively, of the pulmonary trunk as contained in the image data. FIG. 4A illustrates the anatomic landmarks in an exemplary CT image. As illustrated in image 4A, the trigone 402, RVOT 404, main-bifurcation 406, left-bifurcation 408, and right-bifurcation 410 landmarks are shown in the CT image.

Figure 4B:
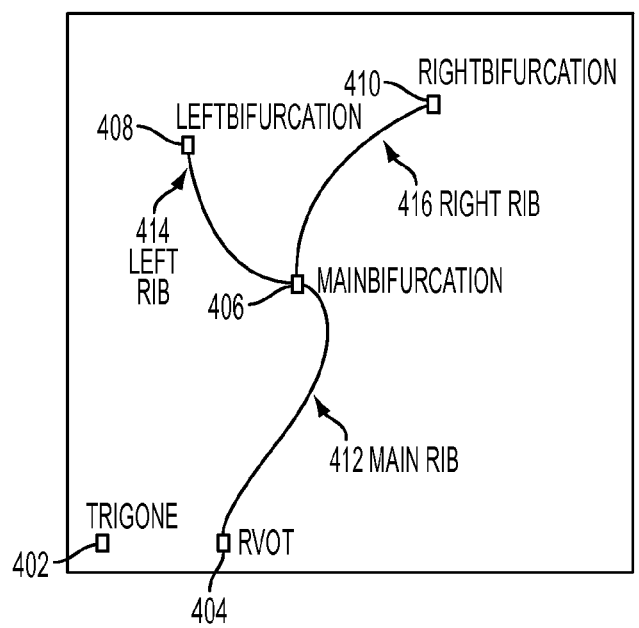
FIG. 4B illustrates ribs of the pulmonary trunk constrained by the anatomic landmarks of FIG. 4A.

The ribs of the pulmonary artery are constrained by the five anatomic landmarks and form the second abstraction layer of the pulmonary trunk model. As used herein, the term "rib" refers to the centerline of an artery branch. The main-rib is the centerline of the main branch of the pulmonary trunk, the left-rib is the centerline of the left branch of the pulmonary trunk, and the right-rib is the centerline of the right pulmonary branch. FIG. 4B illustrates ribs of the pulmonary trunk constrained by the anatomic landmarks of FIG. 4A. As illustrated in FIG. 4B, the main-rib 412 is bounded by the RVOT 404 and main-bifurcation 406. The left-rib 414 extends from the left-bifurcation 408 to the main-bifurcation 406, and the right-rib 416 extends from the right-bifurcation 410 to the main-bifurcation 406.

The third abstraction layer of the model is the surface topology of the pulmonary trunk. The main pulmonary artery along with its bifurcations is modeled as a parametric closed surface similar to a deformed cylinder. NURBS can be used as the parametric representation of the surface. The topology and morphology of the arterial structure is characterized and constrained by the previously defined anatomic landmarks and ribs. In order to obtain the physiological model of the pulmonary trunk, the three cylindrical structures with the main-rib, left-rib, and right-rib as the respective center lines are generate and merged at the bifurcation region (i.e., the main-bifurcation). This physiological model is a generic model that can be used to segment the pulmonary trunk on an individual basis for patient specific CT or MRI data.

Figure 5:
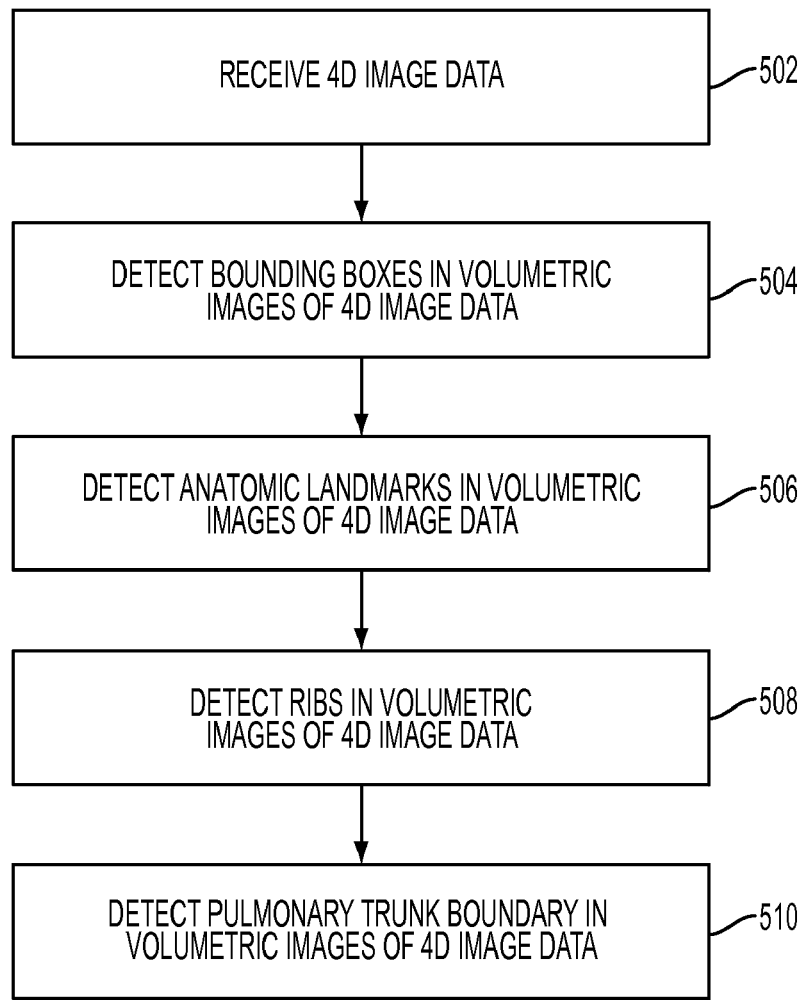
FIG. 5 illustrates a method for modeling the pulmonary trunk based on 4D image data according to an embodiment of the present invention.

The second stage (310 of FIG. 3) is performed online an estimates a patient specific model of the pulmonary artery by fitting the offline model to the available patient specific volumetric images (CT/MRI). FIG. 5 illustrates a method for modeling the pulmonary trunk based on 4D image data according to an embodiment of the present invention. The method of FIG. 5 transforms image data (e.g., CT or MRI) to generate a model of a patient's heart. Referring to FIG. 5, at step 502, 4D cardiac image data is received. For example, the image data can be 4D cardiac CT data or MRI data. The 4D CT data can be a dynamic sequence of 3D cardiac CT volumes taken over a period of time. Each 3D CT volume in the sequence can be referred to as a frame. The sequence of CT volumes can be taken over at least one full cardiac cycle. The MRI data can contain one 3D isometric MRI volume and additional multiple 2D projections acquired over a time period (e.g., a full cardiac cycle). It is possible that the image data can be received directly from an image acquisition device, such as a CT scanning device or an MRI scanning device, in real time as the image data is acquired by the image acquisition device. It is also possible that the image data can be received by loading image data stored in a memory or storage of a computer system, or some other computer readable medium.

Figure 6A:
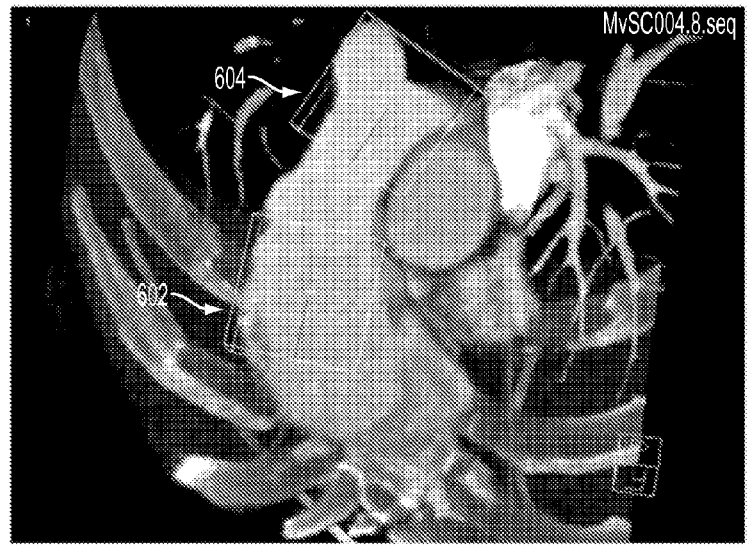
FIG. 6A illustrates bounding box detection in an exemplary CT image.

At step 504, bounding boxes are detected in the volumetric images (frames) of the 4D image data. In particular, bounding boxes which estimate affine parameters (translation (3 parameters), orientation (3 parameters) and scale (3 parameters)) of an RVOT region and a bifurcation region in a volumetric image are detected using a trained bounding box detector. The bounding box detector (classifier) is trained based on annotated training data using a probabilistic boosting tree (PBT) with Haar features. A separate bounding box detector is trained to detect the bounding box at the RVOT region and the bounding box at the bifurcation region. The RVOT region is a region surrounding the RVOT and includes the trigone. The bifurcation region is a region including the main-bifurcation, left-bifurcation, and right-bifurcation. During detection, these detectors are incrementally scanned over the parameter space using Marginal Space Learning (MSL). Detection of the bounding boxes is first performed in one or more reference frames of the 4D image data. For example, the bounding boxes can be first detected in frames representing the End-Diastolic (ED) and End-Systolic (ES) phases of the cardiac cycle, then extended to the remaining frames in a prone search space. Independent bounding box detectors are trained for detecting the bounding boxes in each modality (e.g., CT and MRI). FIG. 6A illustrates bounding box detection in an exemplary CT image. As illustrated in FIG. 6A, the RVOT region bounding box 602 and the bifurcation region bounding box 604 are detected.

Figure 6B:
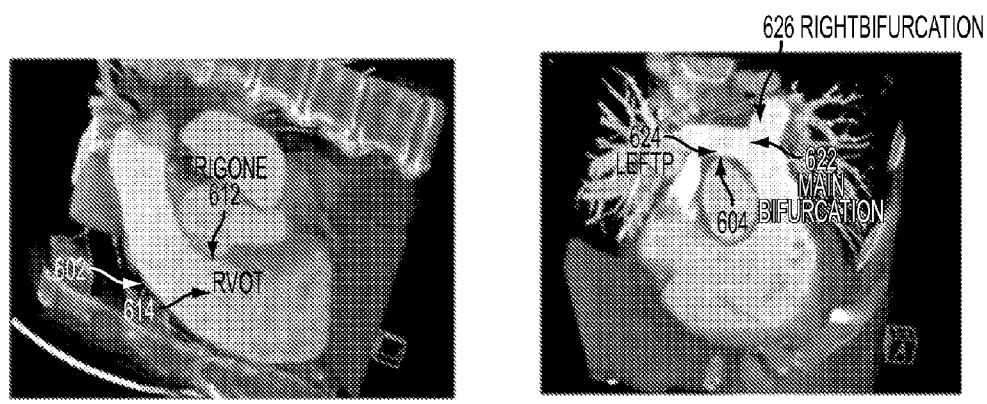
FIG. 6B illustrates anatomic feature detection in exemplary CT images.

Returning to FIG. 5, at step 506, anatomic landmarks are detected in the volumetric images of the 4D image data. In particular the five anatomic landmarks (trigone, RVOT, main-bifurcation, left-bifurcation, and right-bifurcation) used in the physiological pulmonary trunk model are detected using trained detectors (classifiers). Trained detectors for each of the anatomic landmarks are trained based on annotated training data using PBT with Haar features. During detection, the search space for each of the anatomic features is constrained by the parameters of the bounding boxes (e.g., position, orientation, and scaled) detected in step 504, which significantly boosts performance. For example, the search space for detecting the RVOT and the trigone can be constrained by the bounding box at the RVOT region, and the search space for detecting the main-bifurcation, right-bifurcation, and left-bifurcation can be constrained by the bounding box at the bifurcation region. Then anatomic landmarks are initially detected in one or more reference frames, such as the ED frame and the ES frame, and extended to the remaining frames. The anatomic landmark detectors are independently trained for each modality. FIG. 6B illustrates anatomic feature detection in exemplary CT images. As illustrated in FIG. 6B, image 610 shows the trigone 612 and the RVOT 614 detected based on the RVOT region bounding box 602. Image 620 shows the main-bifurcation 622, left-bifurcation 624, and the right bifurcation 626 detected based on the bifurcation region bounding box 604.

Figure 6C:
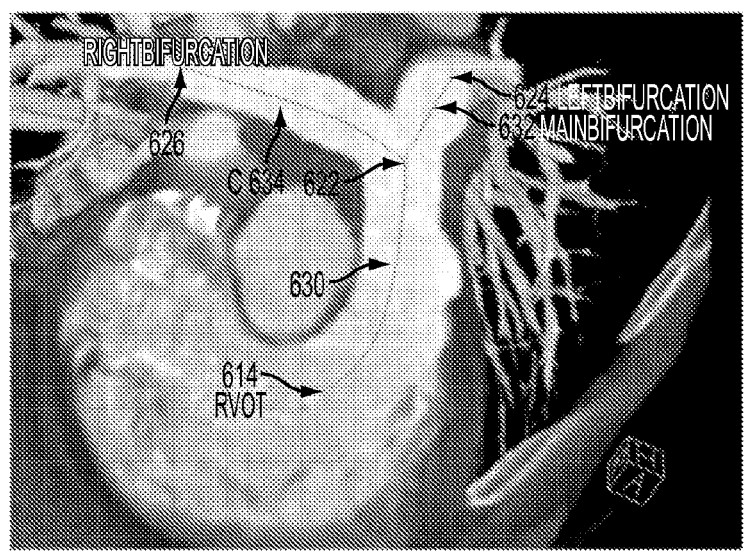
FIG. 6C illustrated pulmonary artery rib detection in an exemplary CT image.

Returning to FIG. 5, at step 508, the ribs of the pulmonary artery are detected. The main-rib, left-rib, and right-rib are initialized based on the landmark positions detected in step 506. In particular, the main-rib is initialized based on the positions of the RVOT and the main-bifurcation, the left-rib is initialized based on the positions of the main-bifurcation and the left-bifurcation, and the right-rib is initialized based on the positions of the main-bifurcation and right-bifurcation. After the three ribs are initialized, using trained circle detectors, the shape/trajectory of the ribs are updated to follow center-line of the corresponding portions of the pulmonary artery. The circle detectors (one for each rib) can be trained based on annotated training data using PBT with Haar features. The circle detectors are sequentially applied to each frame of the sequence (4D image data), starting with the reference frames (ED and ES frames). The circle detectors are independently trained for each modality. FIG. 6C illustrated pulmonary artery rib detection in an exemplary CT image. As illustrated in FIG. 6C, the main-rib 630, left-rib 632, and right-rib 634 of the pulmonary artery are detected based on the RVOT 614, main-bifurcation 622, left-bifurcation 624, and right-bifurcation 626.

Figure 6D:
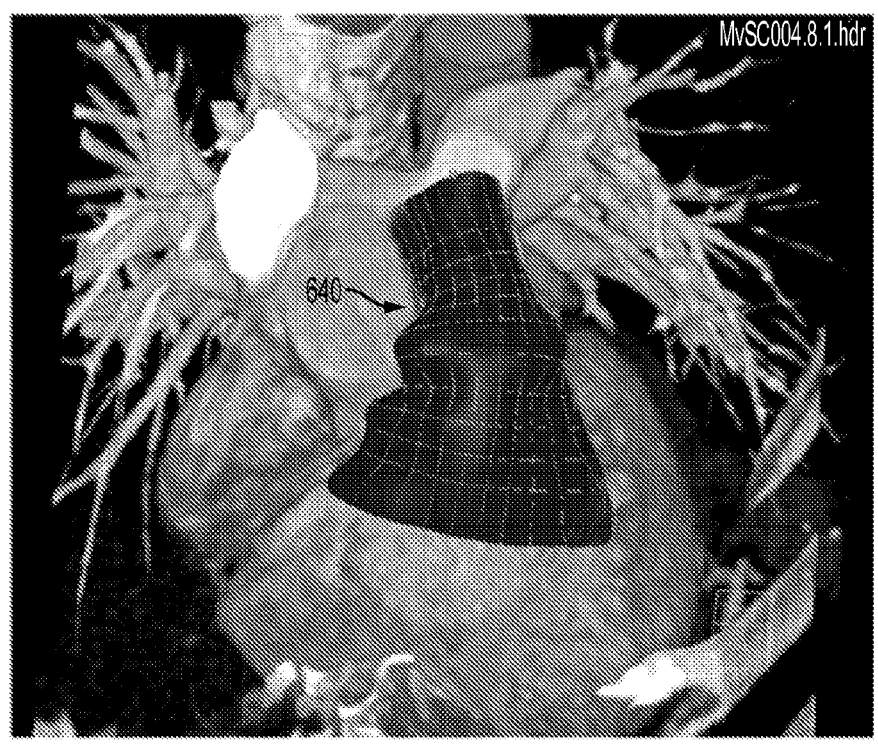
FIG. 6D illustrates pulmonary trunk boundary detection in an exemplary CT image.

Returning to FIG. 5, at step 510, the pulmonary trunk boundary is detected in the volumetric images of the 4D image data. In order to detect the pulmonary trunk boundary to a frame, an initial estimation is obtained by fitting the physiological pulmonary trunk model (generated offline) to the image data based on the detected parameters (i.e., boxes, landmarks, ribs) using a piecewise rigid transformation between the generic RIB structures and the patient specific RIBs. This initial estimation provides an accurate global fitting. For an exact boundary delineation, a trained boundary detector is used to move the parametrical shape points along the normal direction to an optimal position where a score from the boundary detector is highest. The boundary detector can be trained based on annotated training data using PBT with steerable features. After detecting the boundary of the pulmonary trunk in the reference (ED and ES) frames, detection is then propagated in the remaining frames based on the parameters detected for the remaining frames. FIG. 6D illustrates pulmonary trunk boundary detection in an exemplary CT image. As illustrated in image 6D, pulmonary trunk boundary 640 is detected in the image. As shown in image 6D the pulmonary trunk model fits various iso-lines to the patient specific image data.

The method of FIG. 5 results in a 4D segmentation of the pulmonary trunk over the sequence of the 4D image data. For example, the 4D segmentation of the pulmonary trunk can show the dynamics of the 3D geometry of the pulmonary trunk over a full cardiac cycle.

While in case of CT the patient specific data usually contains all of the 3D information over the entire cardiac cycle, MRI data may contain only sparse 3D+t data, which includes multiple 2D+t projections and volumetric data for selected frames. Therefore, in the detection method of FIG. 5, the full parameter set (bounding boxes, anatomic landmarks, ribs, and pulmonary trunk boundary) is estimated first, for frames with full volumetric data. This captures the patient specific morphology. The pulmonary trunk boundary is then propagated to the remaining frames where only 2D+t data is available in order to refine the dynamics.

Once the patient specific 4D pulmonary trunk model is segmented from patient specific image data, the patient specific 4D pulmonary trunk model can be used for efficient quantification and measurement of the pulmonary artery's morphology and function (320 of FIG. 3). As opposed to the current practice, which computes two-dimensional measurements using manual methods, the 4D pulmonary artery segmentation obtained using the method of FIG. 5 facilitates online computation of 4D geometric and dynamic measurements of the pulmonary trunk over the course of the cardiac cycle. For example, possible measurements that can be automatically calculated using the 4D pulmonary trunk model are described below. It is to be understood that these measurements are exemplary and other 4D geometric and dynamic measurements can also be calculated using the patient specific 4D pulmonary trunk model.

Pulmonary Hypertension—Pulmonary Hypertension can be detected when the main pulmonary artery diameter is greater then 29 mm. Using the 4D pulmonary trunk segmentation described above, the diameter of the main pulmonary arty can be computed as the diameter of the largest iso-line of the pulmonary trunk model (in the vertical direction) from the main artery.

McGoon Ratio—In order to predict pulmonary blood flow non-invasively, the McGoon ratio is a practical method to estimate the pulmonary arterial size. It divides the sum of the width of bilateral central pulmonary arteries by the diameter of the descending aorta at the level of the diaphragm. The diameter of the first iso-lines (V=0 in the vertical direction) from the left and right pulmonary artery are computed directly from the model in order to calculate the width of the bilateral central pulmonary arteries. Diameter of the descending aorta can be computed using standard methods.

Pulmonary Artery Index—The Pulmonary Artery Index is a predictor of operative survival in patients undergoing modified fontan repair. The pulmonary artery index (PAI) is defined by the diameters of the right and left pulmonary arteries, immediately proximal to the origin of the first lobar branches. The cross-sectional areas were then calculated, summed, and divided by the body surface area. The areas of the left and right bifurcation proximal to the lobar branches can be calculated directly from the corresponding isolines using the well known Green formula for integration. Body surface area can be determined with standard methods.

Nakata index—The Nakata index is defined as: (left pulmonary diameter+left pulmonary diameter)/BMI. The left and right pulmonary diameters are calculated directly from the patient specific pulmonary trunk segmentation as described above. The body mass index (BMI) can be calculated using standard methods.

Patient classification suitable for percutaneous pulmonary valve implantation (PPVI)—PPVI defines five types of pulmonary trunk morphology based on the diameter measured at three planes: 0%, 50%, and 100% of the pulmonary trunk length. These measurements can be derived directly from the patient specific pulmonary trunk model by extracting the isolines at the corresponding level.

There are a number of advantages of this pulmonary trunk modeling described above. The obtained dynamic model enables advanced pulmonary assessment. Morphological and functional quantification can be efficiently computed from the dynamic model. Additionally, the pulmonary trunk model integrates all the relevant data obtained during a MRI/CT scan in a holistic fashion, so the physiology of the patient's anatomy is accurately represented. Moreover, by using a cross-modality approach, generic high level information obtained from a CT database can be exploited in the system. The extracted model can be utilized to extract morphological information, direct measurements of the pulmonary trunk and the pulmonary dynamics over the cardiac cycle. The database of models can be clustered based on shape and/or dynamics to determine classes of patients and act as a mechanism for decision support. The model representation and fitting methods described above are robust to morphological changes of patient's anatomy. The methodology will perform robustly where the topology of the anatomy is consistent. Although, as described above, CT data is used to generate the generic 4D model, the high spatial and temporal resolution provided by CT data is not unique and the methodology for model generation can utilize any modality which provides high amounts of spatial and dynamic information about the pulmonary trunk.

Figure 7:
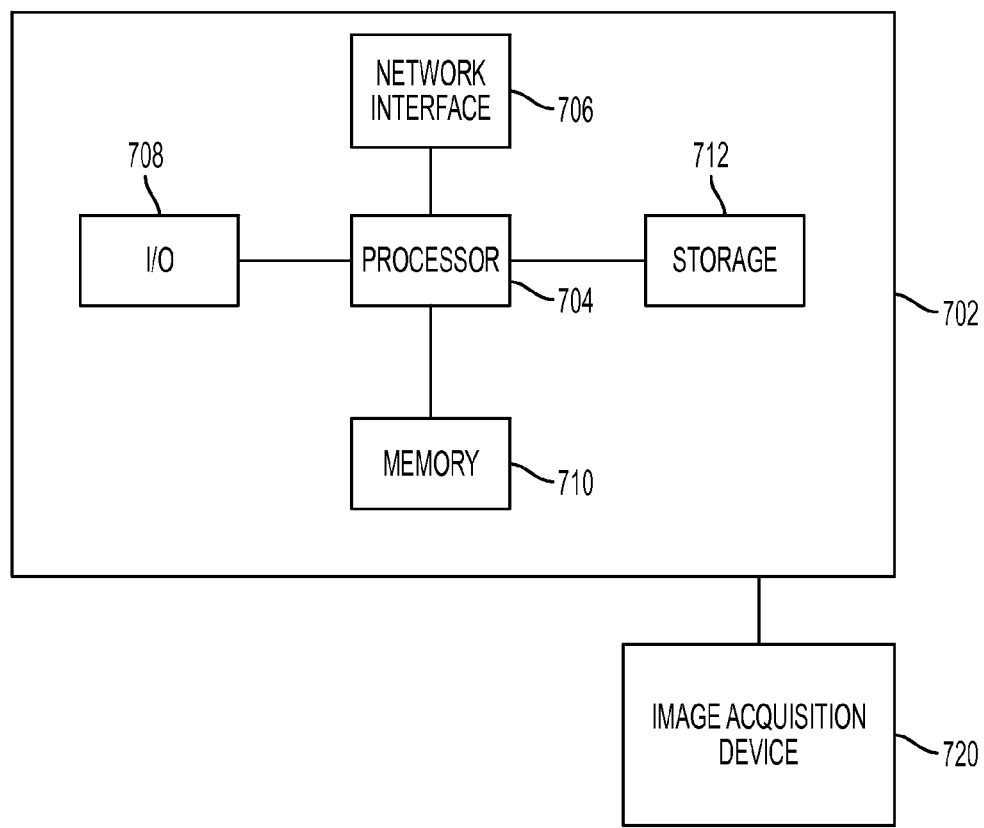
FIG. 7 is a high-level block diagram of a computer capable of implementing the present invention.

The above-described methods for modeling and evaluating a pulmonary trunk may be implemented on a computer using well-known computer processors, memory units, storage devices, computer software, and other components. A high-level block diagram of such a computer is illustrated in FIG. 7. Computer 702 contains a processor 704, which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the stages of the framework of FIG. 3 and the steps of the method of FIG. 5 may be defined by the computer program instructions stored in the memory 710 and/or storage 712 and controlled by the processor 704 executing the computer program instructions. An image acquisition device 720, such as a CT scanning device or MRI scanning device, can be connected to the computer 702 to input image data to the computer 702. It is possible to implement the image acquisition device 720 and the computer 702 as one device. It is also possible that the image acquisition device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.). Such input/output devices 708 may be used in conjunction with a set of computer programs as an annotation tool to annotate volumes received from the image acquisition device 720. One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for generating a pulmonary trunk model from 4D cardiac image data, comprising:
   receiving 4D cardiac image data comprising a plurality of frames, each frame comprising volumetric image data;
   detecting bounding boxes in the frames of the 4D cardiac image data;
   detecting anatomic landmarks in the frames of the 4D cardiac image data based on the detected bounding boxes;
   detecting ribs of a pulmonary artery in the frames of the 4D cardiac image data based on the detected anatomic landmarks; and
   generating a dynamic pulmonary trunk model by fitting a physiological pulmonary trunk model to the frames of the 4D cardiac image data based on the detected ribs and anatomic landmarks.

2. The method of claim 1, wherein said 4D cardiac image data is 4D computed tomography (CT) sequence.

3. The method of claim 2, wherein:
   said step of detecting bounding boxes comprises detecting bounding boxes in frames of the 4D CT sequence representing end-diastolic (ED) and end-systolic (ES) phases of a cardiac cycle and extending the detected bounding boxes to remaining frames of the 4D CT sequence;
   said step of detecting anatomic landmarks comprises detecting anatomic landmarks in the frames of the 4D CT sequence representing the ED and ES phases and extending the detected anatomic landmarks to the remaining frames of the 4D CT sequence;
   said step of detecting ribs comprises detecting ribs of the pulmonary artery in the frames of the 4D CT sequence representing the ED and ES phases and extending the detected ribs to the remaining frames of the 4D CT sequence; and
   said step of generating a dynamic pulmonary trunk model comprises fitting the physiological pulmonary trunk model to frames of the 4D CT sequence representing the ED and ES phases and extending the physiological pulmonary trunk model to the remaining frames of the 4D CT sequence.

4. The method of claim 1, wherein said 4D cardiac image data is MRI data comprising volumetric frames and frames having $2D_+t$ projections.

5. The method of claim 4, wherein said steps of detecting bounding boxes, detecting anatomic landmarks, detecting ribs, and generating a dynamic pulmonary trunk model are performed on the volumetric frames of the MRI data, and the generated dynamic pulmonary trunk model is propagated to the frames having $2D_+t$ projections.

6. The method of claim 1, wherein said step of detecting bounding boxes comprises:
   detecting a bounding box at a right ventricular outflow tract (RVOT) region and a bounding box at a bifurcation region in the frames of the 4D cardiac data.

7. The method of claim 6, wherein said step of detecting a bounding box at an RVOT region and a bounding box at a bifurcation region in the frames of the 4D cardiac data comprises:
   detecting the bounding box at the RVOT region and the bounding box at the bifurcation region using trained detectors for each bounding box, wherein the trained detectors are trained using probabilistic boosting tree (PBT) with Haar features.

8. The method of claim 6, wherein said step of detecting anatomic landmarks comprises:
   detecting trigone and RVOT locations in the frames of the 4D cardiac data based on the detected RVOT region bounding box, and main-bifurcation, left-bifurcation, and right-bifurcation locations in the 4D cardiac data based on the detected bifurcation bounding box.

9. The method of claim 8, wherein said step of detecting trigone and RVOT locations in the frames of the 4D cardiac data based on the detected RVOT region bounding box, and main-bifurcation, left-bifurcation, and right-bifurcation locations based on the detected bifurcation bounding box comprises:
   detecting the trigone, RVOT, main-bifurcation, left-bifurcation, and right-bifurcation locations using trained detectors for each anatomic landmark, wherein the trained detectors are trained using a probabilistic boosting tree (PBT) with Haar features.

10. The method of claim 8, wherein said step of detecting ribs of a pulmonary artery comprises:
    detecting a main-rib based on the detected RVOT and main-bifurcation locations, a left-rib based on the detected main-bifurcation and left-bifurcation locations, and a right-rib based on the detected main-bifurcation and right bifurcation locations.

11. The method of claim 10, wherein said step of detecting a main-rib based on the detected RVOT and main-bifurcation locations, a left-rib based on the detected main-bifurcation and left-bifurcation locations, and a right-rib based on the detected main-bifurcation and right bifurcation locations comprises:
    detecting the main-rib, left-rib, and right rib with trained circle detectors for each rib.

12. The method of claim 1, wherein said step of generating a dynamic pulmonary trunk model comprises:
    generating an initial estimate of the pulmonary trunk model in the frames of the 4D cardiac image data by fitting the physiological pulmonary trunk model based on the detected ribs and anatomic features; and
    detecting a boundary of the pulmonary trunk in the frames of the 4D image data to refine a boundary of the initial estimate of the pulmonary trunk model.

13. The method of claim 12, wherein said step of detecting a boundary of the pulmonary trunk in the frames of the 4D image data comprises:
    detecting the boundary of the pulmonary trunk using a trained boundary detector, wherein the trained boundary detector is trained using probabilistic boosting tree (PBT) with steerable features.

14. The method of claim 1, further comprising:
    quantitatively evaluating the pulmonary trunk using the generated dynamic pulmonary trunk model.

15. An apparatus for generating a pulmonary trunk model from 4D cardiac image data, comprising:
    means for receiving 4D cardiac image data comprising a plurality of frames, each frame comprising volumetric image data;
    means for detecting bounding boxes in the frames of the 4D cardiac image data;
    means for detecting anatomic landmarks in the frames of the 4D cardiac image data based on the detected bounding boxes;

means for detecting ribs of a pulmonary artery in the frames of the 4D cardiac image data based on the detected anatomic landmarks; and means for generating a dynamic pulmonary trunk model by fitting a physiological pulmonary trunk model to the frames of the 4D cardiac image data based on the detected ribs and anatomic landmarks.

16. The apparatus of claim 15, wherein said means for detecting bounding boxes comprises:

means for detecting a bounding box at a right ventricular outflow tract (RVOT) region and a bounding box at a bifurcation region in the frames of the 4D cardiac data.

17. The apparatus of claim 16, wherein said means for detecting anatomic landmarks comprises:

means for detecting trigone and RVOT locations in the frames of the 4D cardiac data based on the detected RVOT region bounding box, and main-bifurcation, left-bifurcation, and right-bifurcation locations in the 4D cardiac data based on the detected bifurcation bounding box.

18. The apparatus of claim 17, wherein said means for detecting ribs of a pulmonary artery comprises:

means for detecting a main-rib based on the detected RVOT and main-bifurcation locations, a left-rib based on the detected main-bifurcation and left-bifurcation locations, and a right-rib based on the detected main-bifurcation and right bifurcation locations.

19. The apparatus of claim 15, wherein said means for generating a dynamic pulmonary trunk model comprises:

means for generating an initial estimate of the pulmonary trunk model in the frames of the 4D cardiac image data by fitting the physiological pulmonary trunk model based on the detected ribs and anatomic features; and means for detecting a boundary of the pulmonary trunk in the frames of the 4D image data to refine a boundary of the initial estimate of the pulmonary trunk model.

20. The apparatus of claim 15, further comprising:

means for quantitatively evaluating the pulmonary trunk using the generated dynamic pulmonary trunk model.

21. A non-transitory computer readable medium encoded with computer executable instructions for generating a pulmonary trunk model from 4D cardiac image data, the computer executable instructions defining steps comprising:

receiving 4D cardiac image data comprising a plurality of frames, each frame comprising volumetric image data;

detecting bounding boxes in the frames of the 4D cardiac image data;

detecting anatomic landmarks in the frames of the 4D cardiac image data based on the detected bounding boxes;

detecting ribs of a pulmonary artery in the frames of the 4D cardiac image data based on the detected anatomic landmarks; and generating a dynamic pulmonary trunk model by fitting a physiological pulmonary trunk model to the frames of the 4D cardiac image data based on the detected ribs and anatomic landmarks.

22. The non-transitory computer readable medium of claim 21, wherein the computer executable instructions defining the step of detecting bounding boxes comprise computer executable instructions defining the step of:

detecting a bounding box at a right ventricular outflow tract (RVOT) region and a bounding box at a bifurcation region in the frames of the 4D cardiac data.

23. The non-transitory computer readable medium of claim 22, wherein the computer executable instructions defining the step of detecting anatomic landmarks comprise computer executable instructions defining the step of:

detecting trigone and RVOT locations in the frames of the 4D cardiac data based on the detected RVOT region bounding box, and main-bifurcation, left-bifurcation, and right-bifurcation locations in the 4D cardiac data based on the detected bifurcation bounding box.

24. The non-transitory computer readable medium of claim 23, wherein the computer executable instructions defining the step of detecting ribs of a pulmonary artery comprise computer executable instructions defining the step of:

detecting a main-rib based on the detected RVOT and main-bifurcation locations, a left-rib based on the detected main-bifurcation and left-bifurcation locations, and a right-rib based on the detected main-bifurcation and right bifurcation locations.

25. The non-transitory computer readable medium of claim 21, wherein said the computer executable instructions defining the step of generating a dynamic pulmonary trunk model comprise computer executable instructions defining the steps of:

generating an initial estimate of the pulmonary trunk model in the frames of the 4D cardiac image data by fitting the physiological pulmonary trunk model based on the detected ribs and anatomic features; and detecting a boundary of the pulmonary trunk in the frames of the 4D image data to refine a boundary of the initial estimate of the pulmonary trunk model.

26. The non-transitory computer readable medium of claim 21, further comprising computer executable instructions defining the step of:

quantitatively evaluating the pulmonary trunk using the generated dynamic pulmonary trunk model.

* * * * *